United States Patent
Eriksson

(10) Patent No.: US 11,963,632 B2
(45) Date of Patent: Apr. 23, 2024

(54) BREWING SYSTEM AND PROCESS OF BREWING A BEVERAGE

(71) Applicant: 3TEMP AB, Arvika (SE)

(72) Inventor: Anders Eriksson, Arvika (SE)

(73) Assignee: 3TEMP AB, Arvika (SE)

( * ) Notice: Subject to any disclaimer, the term of this patent is extended or adjusted under 35 U.S.C. 154(b) by 641 days.

(21) Appl. No.: 15/579,779

(22) PCT Filed: Jun. 8, 2016

(86) PCT No.: PCT/EP2016/063015
§ 371 (c)(1),
(2) Date: Dec. 5, 2017

(87) PCT Pub. No.: WO2016/198442
PCT Pub. Date: Dec. 15, 2016

(65) Prior Publication Data
US 2018/0168391 A1    Jun. 21, 2018

(30) Foreign Application Priority Data
Jun. 9, 2015    (EP) .................................... 15001700

(51) Int. Cl.
*A47J 31/54*    (2006.01)
*A47J 31/46*    (2006.01)
*A47J 31/56*    (2006.01)

(52) U.S. Cl.
CPC ........... *A47J 31/545* (2013.01); *A47J 31/467* (2013.01); *A47J 31/56* (2013.01)

(58) Field of Classification Search
CPC ......... A47J 31/545; A47J 31/467; A47J 31/56
See application file for complete search history.

(56) References Cited

U.S. PATENT DOCUMENTS

| | | | | |
|---|---|---|---|---|
| 6,142,063 A | * | 11/2000 | Beaulieu | A47J 31/56 99/283 |
| 2003/0003208 A1 | * | 1/2003 | Lassota | A47J 31/52 426/433 |

(Continued)

FOREIGN PATENT DOCUMENTS

| CN | 103889288 | 6/2014 |
|---|---|---|
| EP | 2 768 359 | 1/2016 |

(Continued)

OTHER PUBLICATIONS

Office Action issued in corresponding Chinese Patent Application No. 201680046801.9, dated Aug. 20, 2019, pp. 1-6, Translation pp. 1-7.

(Continued)

*Primary Examiner* — Steven N Leff
(74) *Attorney, Agent, or Firm* — Jeffrey S. Melcher; Melcher Patent Law PLLC

(57) ABSTRACT

The present invention relates to a process and a system for brewing a beverage in a beverage brewing system, said system comprising: i) a water inlet line; ii) means for controlling flow of water connected to said water inlet line; iii) at least one water heating device for heating water to a predetermined temperature connected downstream to and in communication with said means for controlling flow of water; iv) a water dispenser connected downstream to and in communication with said at least one water heating device, said water dispenser comprising means for controllable dispense of water; v) optionally a water distribution device arranged to receive dispensed water from said water dispenser; vi) a beverage substance container arranged to receive dispensed water from said water dispenser or said water distribution device; vii) a beverage container arranged to receive dispensed beverage from said beverage substance container wherein the flow rate of water in said system is (Continued)

adjusted so as to correspond to a predetermined water temperature in the water dispenser.

29 Claims, 1 Drawing Sheet

(56) References Cited

U.S. PATENT DOCUMENTS

| | | | |
|---|---|---|---|
| 2006/0005712 A1 | 1/2006 | Greenwald | |
| 2006/0011069 A1* | 1/2006 | Spencer | A47J 31/4403 99/307 |
| 2008/0041231 A1* | 2/2008 | Beharry | A47J 31/54 99/279 |
| 2013/0344205 A1* | 12/2013 | Oh | B65D 85/8043 426/232 |
| 2014/0272025 A1 | 9/2014 | Wheeler | |

FOREIGN PATENT DOCUMENTS

| | | |
|---|---|---|
| JP | H7-220161 | 8/1995 |
| JP | 2000-251144 | 9/2000 |
| JP | 2005-37074 | 2/2005 |
| JP | 2009-504344 | 2/2009 |
| WO | 2007/022388 | 2/2007 |
| WO | WO-2007051200 A2 * | 5/2007 ............ A47J 31/402 |
| WO | 2013/057506 | 4/2013 |

OTHER PUBLICATIONS

International Search Report issued in PCT/EP2016/063015 dated Aug. 8, 2016, pp. 1-2.
Written Opinion issued in PCT/EP2016/063015 dated Aug. 8, 2016, pp. 1-5.
Office Action issued in corresponding Australian Patent Application No. 2016274559, dated Apr. 1, 2020, pp. 1-4.
Office Action issued in corresponding Japanese Patent Application No. 2017-564328, dated May 25, 2020, pp. 1-11.
Office Action issued in corresponding Austrailan Patent Application No. 2016274559, 278 dated Aug. 2020, pp. 1-5.
Office Action issued in corresponding Chinese Patent Application No. 2016800468019, dated Jun. 9, 2020, translation pp. 1-3, pp. 1-5.
Office Action issued in corresponding Chinese Patent Application No. 510627, dated Jan. 15, 2022, pp. 1-4, Translation of first two pages, and Notice.
Office Action issued in corresponding Chinese Patent Application No. 510627, dated Jul. 5, 2021, pp. 1-4, Translation of first two pages, and Notice.
Notice issued in corresponding Korean Patent Application No. 520180014898, dated Jan. 28, 2022, pp. 1-6.
Notice issued in corresponding Chinese Patent Application No. 510627, dated Sep. 28, 2021, pp. 1-5.

* cited by examiner

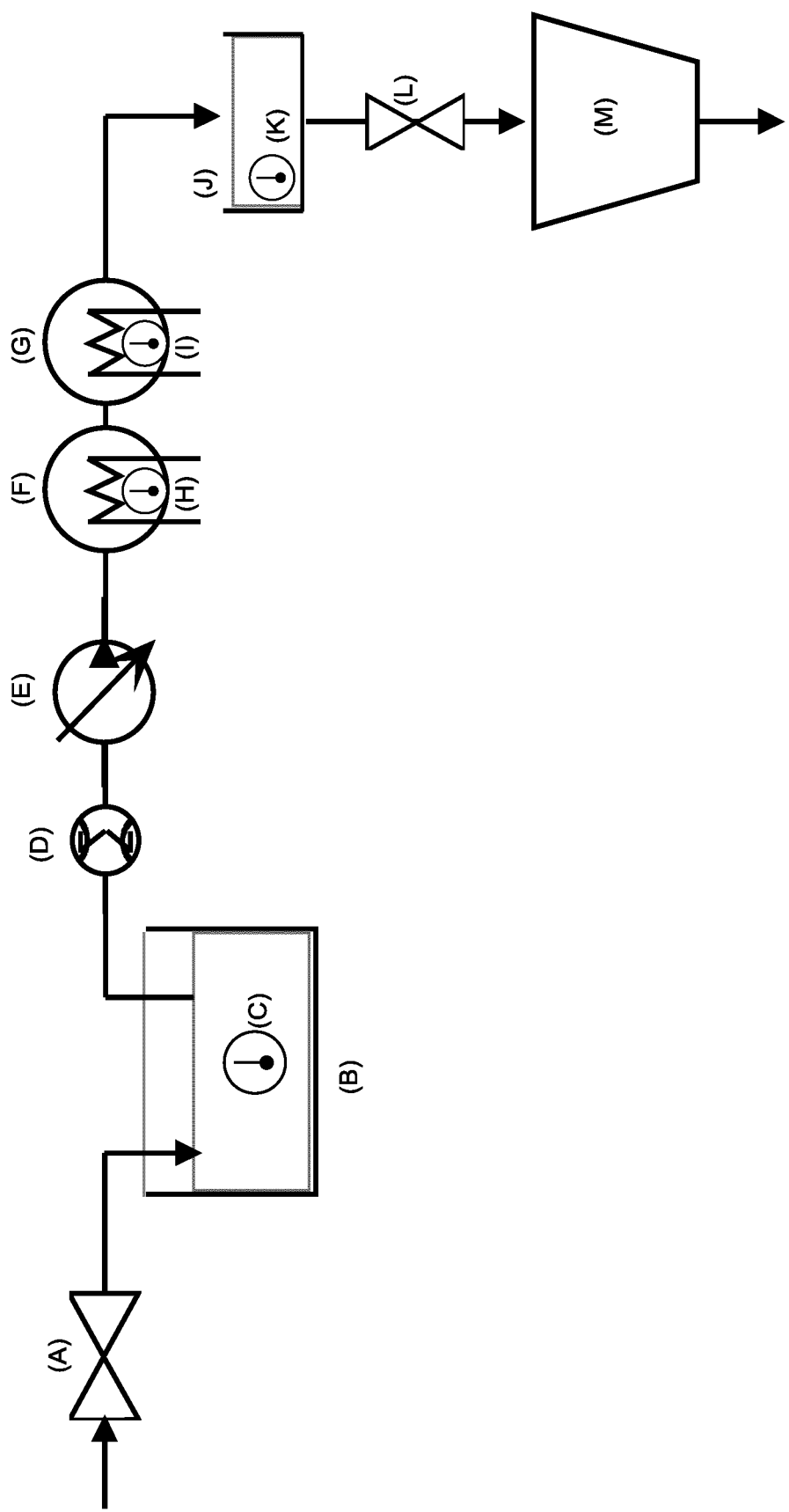

BREWING SYSTEM AND PROCESS OF BREWING A BEVERAGE

CROSS-REFERENCE TO RELATED APPLICATIONS

This application is a National Phase Application of PCT International Application No. PCT/EP2016/063015, International Filing Date, Jun. 8, 2016, claiming priority to EP15001700.2, filed Jun. 9, 2015, each of which is hereby incorporated by reference in its entirety.

The present invention relates to a process and a system for brewing a beverage, preferably coffee such as filter coffee; or tea. The invention also relates to a process of cleaning the system wherein an automatic temperature calibration is performed during said cleaning, and to a process of calibrating such system.

BACKGROUND OF THE INVENTION

A variety of brewing apparatuses have been developed utilizing methods of distributing water over a brewing substance. In some of these systems, water is controllably turned on and off to dispense water during the production of a beverage. U.S. Pat. No. 4,969,392 relates to a coffee machine in which water is retained in a temperature-controlled container whereupon water, when at sufficient temperature, is dispensed on the ground coffee to initiate a brewing process. However, U.S. Pat No. 4,969,392, does not allow sufficient temperature control of water to provide a stable contact temperature with the ground coffee. Whereas attempts to control the brewing temperature have been made, there is a need to further safeguard accurate contact temperature of water and coffee such that the brewing process can be operated in a stable manner. Many known processes have not proved to be stable enough since they almost constantly need regulation of the temperature of the water resulting in unstable process conditions.

The present invention intends to provide a process and a system for brewing a beverage in which the temperature control is safeguarding an accurate contact temperature of water and brewing substance. A further objective of the invention is to provide a stable process without continuously and incessantly adjusting the heating of water or flow of water in the beverage system. A further objective of the invention is to provide a system for brewing a beverage and a process of cleaning and calibrating such system.

THE INVENTION

The present invention relates to a process for brewing a beverage in a beverage brewing system, said system comprising
i) a water inlet line
ii) means for controlling flow of water connected to said water inlet line
iii) at least one water heating device for heating water to a predetermined temperature connected downstream to and in communication with said means for controlling the flow of water
iv) a water dispenser connected downstream to and in communication with said at least one water heating device, said water dispenser comprising means for controllable dispense of water
v) optionally a water distribution device arranged to receive dispensed water from said water dispenser
vi) a beverage substance container arranged to receive dispensed water from said water dispenser or said water distribution device
vii) a beverage container arranged to receive dispensed beverage from said beverage substance container
wherein the flow rate of water in said system is adjusted so as to correspond to a predetermined water temperature in the water dispenser.

The term "beverage" is intended to include e.g. tea, herbs, coffee as well as other substances and any other form of beverages or food substances. According to one embodiment, the brewing substance is coffee or tea, preferably filter coffee. The types of coffee and tea may be any of those in the marketplace. According to one embodiment, settings of the system including manual settings or preprogrammed recipes may be selected according to the type of coffee or tea to be brewed so as to adjust suitable taste characteristics thereof.

The term "water dispenser" is intended to include any dispenser which may accumulate water during a certain period of time thereby functioning as a water container or reservoir prior to dispense of said water, e.g. for pre-wet treatment or flushing of water prior to or between brewing cycles. According to one embodiment, the water dispenser is equipped with means for controlling dispense of water, e.g. a valve. Water may thus either accumulate for a certain period of time in said dispenser or continuously pass through the dispenser depending on the setting of e.g. said valve regulating the flow of water through the dispenser. Preferably, said means for retaining and controlling dispense of water is coupled to a controller. Preferably, a controller may be preprogrammed with a recipe or settings so as to control dispense of water from the water dispenser during the brewing process.

The term "brewing cycle" is defined as a period of time during which a certain volume of water passing the water dispenser is dispensed over the brewing substance, e.g. coffee, at predefined process conditions including temperature of water in the water dispenser etc. The temperature of the water in the dispenser is of utmost importance for the brewing process since this temperature may be assumed to be the same in the beverage substance container containing for example coffee in a filter. Since the contact temperature between water and coffee preferably is in the range from 80 to 96, for example from 85 to 96 or from 90 to 96, or from 92 to 96° C., the control of the temperature in the dispenser (which is easier to measure than in the substance container) is crucial of this reason.

The terms "pre-wet" and "flush" mean dispensing water on the beverage substance prior to commencing a brewing cycle whereby beverage substance is pre-wetted; or flushing the beverage substance in between brewing cycles. Typically, pre-wetting and flushing are performed by dispensing an accumulated predetermined volume of water stored in the dispenser, for example from 0% to 15%, for example from 1% to 15% or from 5% to 15% by volume of the total volume of water used for the whole brew over the beverage substance. Whereas a flush may be performed at any time during the brewing process, a pre-wetting operation is effected initially before any brewing cycle is commenced to wet the beverage substance. One advantage with pre-wetting or flushing of water is to provide for stable contact temperature of water and beverage substance during the entire brewing process including the initial phase which usually gives rise to an increased leaching of the beverage substance. Another advantage with pre-wetting or flushing of water may be to simulate the so called pour over technique practiced by baristas around the world.

According to one embodiment, the system may comprise at least one controller. Preferably one single controller controls all parameters in the brewing process.

According to one embodiment, the water heating device is controlled to transfer a substantially constant amount of heat to water introduced into the system. By maintaining the transfer of heat substantially constant, a more controlled and stable process can be provided. Preferably, the flow rate of water may fluctuate up to 10%, preferably up to 5%, and most preferably up to 1% from its calculated set-point during the brewing process. By maintaining the heating of water substantially constant, a more stable process may be obtained enabling a stable flow of water to the water dispenser. According to one embodiment, a sensor, for example a temperature sensor, is arranged in the water heating device so as to monitor and measure the transfer of heat to water. The sensor may be coupled to a controller controlling changes in water temperature.

According to one embodiment, at least two water heating devices are connected in series.

Preferably, each of said at least two water heating devices are equipped with a sensor for measuring the temperature coupled to a controller.

The degree of heating may be adapted in accordance with the volume of water to be processed in the system. Variation in heating may thus be applied depending on e.g. the volume of beverage to be brewed. Water is introduced to the system via the water inlet line. According to one embodiment, said means for controlling flow comprises a flow meter and means for driving water through the system, e.g. a pump. According to one embodiment, the means for controlling the flow of water controls the timing, flow rate, temperature of water and other characteristics of driving or moving water, preferably by pumping by the pump mechanism. According to one embodiment, the pump mechanism may be any of those which are currently available to move water from a water inlet line to the brewing substance container.

According to one embodiment, the driving device of the pump may be embodied as e.g. a gear pump, piston pump, bellows pump, wave pump, peristaltic pump, or any other driving device which is capable of moving water from the water inlet line. According to one embodiment, the brewing system comprises a pump, preferably an air pump system, to drive or move water from a water inlet line, which preferably is connected to a reservoir, container, tank or other water source, to a beverage substance container. According to one embodiment, the water inlet line is in communication with a pressurized or non-pressurized water source. For example, a container and/or a tank may be connected upstream to said water inlet line so as to supply the system with water. According to one embodiment, a device for reducing or eliminating air bubbles, e.g. an air breaker, is arranged upstream the means for controlling flow of water. According to one embodiment, a controller is arranged to communicate and receive input data from said means for controlling flow. According to one embodiment, a controller is coupled to receive temperature data, suitably by arranging temperature sensors at said water inlet line, at said at least one water heating device, and/or at said water dispenser.

According to one embodiment, said predetermined temperature (corresponding to the temperature in the water dispenser, e.g. from 80 to 96° C.) is controlled by
  i) inputting temperature data from at least said water inlet line to a controller; and
  ii.a) calculating the flow rate of water resulting in said predetermined temperature in the water dispenser; or
  ii.b) determining the flow rate of water by consulting a look-up table.

In view of ii.a), it should be noted the calculation of the flow rate necessary to achieve a predetermined temperature in the water dispenser may be made by calibrating the system. A calibration of the system may be performed by measuring manually (for example while performing the brewing process or running water through the system) the temperature at the water inlet line, the water temperature in the water dispenser (which when the system is in operation is the predetermined temperature), and the water flow. The water flow may be measured by any flow meter. By making said measurements, the heat transfer in the heating device can be calculated. Now, given the inlet temperature, the calculated heat transfer by the heating device and a (desired) predetermined temperature (or target temperature) in the water dispenser, e.g. 96° C., the necessary flow rate to obtain 96° C. can be calculated and controlled by the controller. Thus, according to one embodiment, the process of brewing a beverage is based on calibration of the temperature in the water dispenser by controlling the temperature of the water flowing into the water heating device. According to one embodiment of the invention. According to one embodiment, the measured temperature of the water in the water dispenser (if different from the predetermined target temperature) is used to adjust said temperature for subsequent brewing.

According to one embodiment, the predetermined temperature ranges from about 70 to 110° C., preferably from about 85 to 99 or 80 to 96° C., or most preferably from about 92 to about 96° C. According to one embodiment, the water dispenser is preheated by introducing steam to said dispenser. By preheating the water dispenser in such manner, the temperature of the first water introduced in the water dispenser will not be essentially cold down prior to dispense. According to one embodiment, such preheating may be accomplished by heating water in the water heating device to about 100° C. or above 100° C. such as up to about 110° C. to produce said steam. The predetermined temperature is preferably measured in the water dispenser close to the point where water is dispensed, e.g. close to a valve or other opening which preferably is controlled by a controller.

By means of the controller, various settings and preprogrammed recipes can be provided. This means that for example a combination of brewing cycles performed at different temperatures and flow rates may be performed to influence the characteristics of the coffee.

According to one embodiment, at least one of the following settings is selected
  i) a pre-wetting operation of beverage substance is performed by accumulating a predetermined volume of water in said water dispenser prior to dispensing of said volume on the beverage substance
  ii) a plurality of brewing cycles are performed at different temperatures
  iii) a predetermined volume of water is accumulated in the water dispenser in between at least two brewing cycles prior to dispensing said volume on the beverage substance.

The invention further relates to a system for brewing comprising
  i) a water inlet line
  ii) means for controlling the flow of water connected to said water inlet line iii) at least one water heating device for heating water to a predetermined temperature connected downstream to and in communication with said means for controlling flow of water iv) a water dispenser connected downstream to and in communication with said at least one water heating device, said water dispenser comprising means for controllable dispense of water v) optionally a water distribution device arranged to receive dispensed water from said water dispenser vi) a beverage substance container arranged to receive dispensed water from said water dispenser or said water distribution device vii) a beverage container arranged to receive dispensed beverage from said beverage substance container viii) a controller comprising means for i) receiving temperature data from said water inlet line, said at least one water heating device, and said water dispenser ii) controlling power supply of said at least one water heating device, and iii) controlling the flow rate of water resulting in a predetermined water temperature in said water dispenser.

According to one embodiment, in order to maintain the predetermined water temperature substantially constant, the flow rate is adjusted in relation to the transfer of heat by said at least one water heating device. Such adjustment can be controlled by the controller receiving input data from changes in heat transfer which may occur due to various reasons in said at least one water heating device. According to one embodiment, if the temperature of the water in the heating device is reduced and such change in temperature is received by the controller, the flow rate of water is adjusted so as to maintain the predetermined temperature in the water dispenser. Alternatively, according to one embodiment, the power of the heating device is adjusted so as to transfer heat corresponding to the desired predetermined temperature.

According to one embodiment, a water source is connected upstream to said water inlet line as further described herein. According to one embodiment, an automatic temperature calibration is performed continuously while the system is in operation or during a cleaning program.

The heat transferred by said at least one heating device may vary over time depending on e.g. ambient temperature, i.e. the temperature in e.g. the room where the system is in operation, the power input, and lime deposits in the water heating device. When such parameters vary, a calibration needs to be performed at suitable points in time or continuously to provide for a sufficiently well controlled system. Preferably, an automatic temperature calibration should be performed when the temperature in the water dispenser differs about 2° C., preferably 1° C. above or below its set-point, i.e. the predetermined temperature at which it should be according to an initial calibration. According to one embodiment, at least one of the parameters inlet temperature, predetermined temperature, and water heating device is continuously controlled by the controller. According to one embodiment, the water dispenser is connected to a water distribution element, preferably a water distribution head, e.g. a spray head. The water distribution element such as a spray head may deliver water to the beverage substance container, suitably in a homogeneous and/or even manner so as to distribute the flow of water over the whole beverage substance. According to one embodiment, the controller is preferably associated with a control mechanism. According to one embodiment, the controller is coupled to the various parts of the brewing system including the means for dispensing water and temperature sensors, control valve or similar means comprised in the water dispenser; said at least one water heating device, and said means for controlling the flow of water. The controller may be embodied by means of an electronic control device such as a microcontroller, digital signal processor or other programmable electronics such as FPGA, ASIC and other types of computer or logic circuits as well as specialized circuitry or components performing desired functions. According to one embodiment, the controller is coupled to a control mechanism facilitating control of the brewing system by the user. According to one embodiment, the control mechanism comprises a control interface which preferably allows the user to control the characteristics of the beverage produced by the brewing system, for example to adjust the period of time for each brewing cycle, the period of time during which no water is dispensed to the beverage substance container, and the temperature of water dispensed from the water dispenser. Thereby, the user can control by means of the control interface the characteristics of the beverage, e.g. the strength, flavour, and extraction characteristics of the beverage produced by the beverage system. According to one embodiment, the control interface may include a display such as LED, LCD, intensity changing light, audio, or other display and manually controllable switches. According to one embodiment, a device may be used in conjunction with a reader input device coupled to the controller to embody the control interface. The reader input device could be an optical reader such as a bar code or a quick response code (QR Code) reader or an electromagnetic input reader such as a wireless communication unit. Examples of wireless communication units could be Bluetooth, RFID, by WiFi or other wireless communication protocol. According to one embodiment, the control mechanism may include other settings which are independently controlled or controlled in conjunction with the control interface such as a "half ([½])" pot," "full pot,", "single cup", or a volume of the beverage produced ranging for example from about 1 to 1000, for example from 50 to 500, or 50 to 100 ml. According to one embodiment, the brewing substance container may be e.g. a brewing funnel for retaining brewed beverages in a drip coffee maker, a pod, or a cartridge. The system may be configured to accommodate said funnel by means of e.g. a single cup or "pod" retaining device. According to one embodiment, intervals in time during which no water is dispensed are used to steep and saturate brewing substance with water. This may increase the amount of flavorings, oils, soluble and other particulate matter which may be flushed, for example during a pre-wet operation, from the beverage substance to create the brewed beverage. According to one embodiment, any number of brewing cycles can be preprogrammed as a recipe or manually inputted into the controller based on preferences, types and quantities of coffee to be used with the system as well as other criteria.

The invention also relates to a method of performing a cleaning program of the system wherein an automatic temperature calibration is performed during said cleaning program. The invention further relates to a process for calibrating a system for brewing a beverage comprising continuously monitoring internal and/or external parameters influencing a predetermined temperature of the water at the outlet of a water heating device, preferably said at least one water heating device as defined herein, or a water dispenser, preferably a water dispenser as defined herein, wherein a predetermined deviation from said desired temperature is continuously controlled so as to enable adjustment of the temperature, for example by sending a signal to a control unit or an operator that manually can adjust the temperature so as to readjust the temperature to reach the predetermined (and desired) temperature. For example, a signal may be sent if the temperature has deviated at least 1 degree or for example 2 degrees from the predetermined temperature.

According to one embodiment, by the wording "continuously monitoring" is meant regular monitoring over time, for example every day, preferably every hour or more preferably every minute or every second. According to one embodiment, the desired temperature, target temperature, at the outlet of the water heating device ranges from 80 to 96, for example 90 to 96, or 92 to 96° C. According to one embodiment, the desired temperature ranges from 80 to 90, for example from 80 to 88, or from 80 to 86° C. By the term "external parameter" is meant a parameter outside the system for brewing the beverage, for example input of power to the system, ambient temperature or the like which may influence the desired temperature. By the term "internal parameter" is meant a parameter which can be adjusted inside the system, for example flow rate of water through the water heating device influencing the retention time of water in the heating device and thereby the desired temperature of water at the outlet of the heating device. Formation of scale is another internal parameter inside the system which influences heat transfer and deviations from the desired temperature. According to one embodiment, the process is calibrated by adjusting the temperature in accordance with a change of an external parameter, for example input of voltage and/or current to the water heating device. According to one embodiment, the process is calibrated by adjusting the temperature in accordance with a change of an internal parameter, for example due to scaling on heat transfer elements in the water heating device.

According to one embodiment, the system for brewing a beverage as defined herein and in the independent claims is calibrated. Thus, the process as defined herein and in the independent claims can be calibrated by said calibrating process.

BRIEF DESCRIPTION OF THE DRAWINGS

FIG. 1 illustrates the system and the flow of water passing an inlet valve A and subsequently an optional air breaker B eliminating or at least reducing the amount of bubbles in the water. An inlet temperature sensor C is mounted in the air breaker (or elsewhere upstream the water heating device) to determine the inlet temperature of water entering into the water heating device (here illustrated by heating blocks F and G in which corresponding sensors H and I for determining the temperature are mounted). Sensors C, H and I are coupled to a controller (not shown) to which they send temperature input data. A flow pulser D and a pump E are arranged upstream the heating device comprising heating blocks F and G. Preferably, a flow meter such as a pulsar D and means for feeding water such as a pump E are arranged upstream the water heating device. The flow pulser and the pump are in communication with a controller which can regulate the flow rate of water based on input data inter alia from the temperature sensors. Downstream from the water heating device a water dispenser J is arranged in which a further temperature sensor K is mounted. The predetermined temperature in the dispenser J can be assumed to be the same or at least very close to the contact temperature of water and beverage substance in the beverage substance container M where suitably a filter may be arranged, such as a coffee filter holding coffee. The water dispenser J is equipped with a valve L downstream of which the beverage substance container M is arranged. The valve L is likewise in communication with the controller so as to enable opening and closing thereof, for example to enable operation of manually set or preprogrammed brewing cycles whereby the valve is opened and closed respectively depending on the program performed. In the substance container the mixing of hot water and brewing substance is carried out to produce the beverage exiting at the arrow below the substance container M. The invention being thus described, it will be obvious that the same may be varied in many ways. Such variations are not to be regarded as a departure from the gist and scope of the present invention, and all such modifications as would be obvious to one skilled in the art are intended to be included within the scope of the claims.

The invention claimed is:

1. A process for brewing a beverage in a beverage brewing system comprising:
    flowing water into a water inlet line;
    measuring a flow rate of the water flowing through the inlet line using a flow meter connected to a controller;
    the controller controlling a flow rate of water flowing through the inlet line by adjusting at least one of an inlet valve connected to the inlet line or a water pump connected to the inlet line;
    measuring a temperature of the water flowing through the inlet line using an inlet temperature sensor connected to the controller;
    after the temperature of the water flowing through the inlet line has been measured, flowing the water from the inlet line into and through at least one heating device providing a constant amount of heat to the flow of water to form a flow of heated water exiting the at least one heating device;
    measuring a final temperature of the flow of heated water by a further temperature sensor connected to the controller;
    the controller determining a heating flow rate of water through the at least one heating device to provide a predetermined temperature of the flow of heated water based on a temperature reading from the inlet temperature sensor and the constant amount of heat provided by the at least one heating device;
    the controller adjusting the flow rate of the water through the inlet line to adjust the flow rate of the flow of water through the at least one heating device to the heating flow rate that provides the predetermined temperature of the flow of heated water;
    brewing the beverage with the flow of heated water, and dispensing the beverage from the system.

2. The process according to claim 1, further comprising maintaining a power supply to said at least one water heating device at a substantially constant level.

3. The process according to claim 1, wherein the controller determines said predetermined temperature by calculating the heating flow rate of water resulting in said predetermined temperature or determining the heating flow rate of water by consulting a look-up table.

4. The process according to claim 1, wherein the predetermined temperature ranges from about 80 to about 96° C.

5. The process according to claim 1, wherein at least one of the following settings is selected
    i) a pre-wetting operation of beverage substance is performed by storing a predetermined volume of heated water in a water dispenser and subsequently dispensing said volume on a beverage substance to brew the beverage, and
    ii) a plurality of brewing cycles are performed at different temperatures.

6. The process according to claim 1, wherein the water inlet line is in communication with a pressurized or non-pressurized water source.

7. The process according to claim 1, wherein a container is connected upstream to said water inlet line.

8. The process according to claim 1, wherein the beverage is coffee or tea.

9. A process for calibrating a system for brewing a beverage comprising continuously monitoring internal and/or external parameters influencing the predetermined temperature of the water according to claim 1, wherein a predetermined deviation from said predetermined temperature is controlled to enable adjustment of said predetermined temperature.

10. Process according to claim 9, wherein the process is calibrated by adjusting the temperature in accordance with a change of an external parameter.

11. Process according to claim 10, wherein the external parameter is input of voltage and/or current to a water heating device influencing the predetermined temperature of the flow of water.

12. Process according to claim 9, wherein the process is calibrated by adjusting the temperature in accordance with a change of an internal parameter.

13. Process according to claim 12, wherein the process is calibrated by adjusting the water temperature due to scaling on said water heating device or failure of equipment in the system.

14. The process according to claim 1, wherein the controller controlling the flow rate of the water flowing through the inlet line by adjusting the inlet valve connected to the inlet line.

15. The process according to claim 1, wherein the controller controlling a flow rate of the water flowing through the inlet line by adjusting the water pump connected to the inlet line.

16. The process according to claim 1, wherein the flow rate of the water fluctuates at most up to 1% from a calculated set-point.

17. The process according to claim 1, wherein the measured final temperature of the heated water by the further temperature sensor is different from the predetermined temperature in a first brewing process and the controller for a subsequent brewing process calculating a new flow rate of water so that the final temperature of the heated water for the subsequent brewing process matches the predetermined temperature.

18. A process for brewing a beverage in a beverage brewing system comprising:
flowing water into a water inlet line;
measuring a flow rate of the water flowing through the inlet line using a flow meter connected to a controller;
the controller controlling a flow rate of water flowing through the inlet line by adjusting a water pump connected to the inlet line;
measuring a temperature of the water flowing through the inlet line using an inlet temperature sensor connected to the controller;
after the temperature of the water flowing through the inlet line has been measured, flowing the water from the inlet line into and through at least one heating device providing a constant amount of heat to the flow of water to form heated water;
transferring the heated water to a water dispenser;
measuring a final temperature of the heated water in the water dispenser by a further temperature sensor connected to the controller;
the controller determining a heating flow rate of water through the at least one heating device to provide a predetermined temperature of the heated water in the dispenser based on a temperature reading from the inlet temperature sensor and the constant amount of heat provided by the at least one heating device;
the controller adjusting the flow rate of the water through the inlet line to adjust the flow rate of the flow of water through the at least one heating device to the heating flow rate that provides the predetermined temperature of the heated water in the water dispenser; and
dispensing the heated water from the water dispenser onto a beverage substance to form a beverage.

19. The process according to claim 18, wherein the flow rate of the water fluctuates at most up to 1% from a calculated set-point.

20. The process according to claim 18, wherein the measured final temperature of the heated water by the further temperature sensor is different from the predetermined temperature in a first brewing process and the controller for a subsequent brewing process calculating a new flow rate of water so that the final temperature of the heated water for the subsequent brewing process matches the predetermined temperature.

21. The process according to claim 18, further comprising selecting a preprogrammed recipe or setting in the controller.

22. The process according to claim 18, further comprising pre-wetting the beverage substance prior to commencing a brewing cycle by dispensing 1 to 15% by volume of water used to brew the beverage.

23. The process according to claim 18, wherein the at least one heating device comprising a first heating device and a second heating device connected in series.

24. The process according to claim 18, wherein the final temperature of the water is reduced and such change in temperature is received by the controller, and the controller recalculating the heating flow rate and adjusting the flow water to the recalculated heating flow rate to maintain the predetermined temperature.

25. The process according to claim 18, further comprising a reader input device connected to the controller.

26. The process according to claim 25, wherein the reader input device comprising at least one of an optical reader, a bar code, a quick response code (QR Code) reader, an electromagnetic input reader, or a wireless communication unit.

27. The process according to claim 18, wherein the controller determines the heating flow rate of water by consulting a look-up table.

28. The process according to claim 18, wherein the predetermined temperature ranges from about 80 to about 96° C.

29. A process for calibrating a system for brewing a beverage comprising continuously monitoring internal and/or external parameters influencing the predetermined temperature of the water according to claim 18, wherein a predetermined deviation from said predetermined temperature is controlled to enable adjustment of said predetermined temperature.

* * * * *